Figure 1:
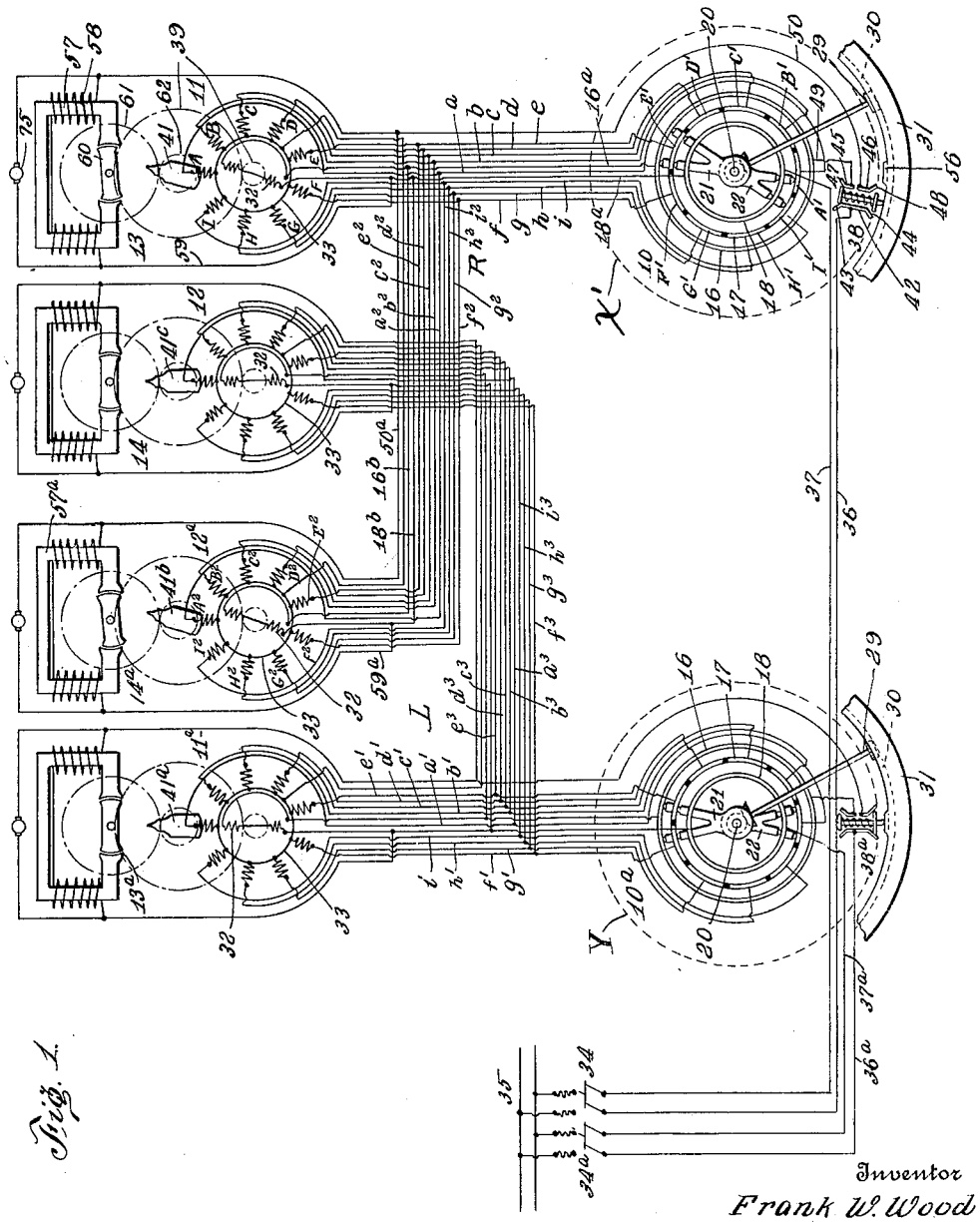

F. W. WOOD.
TURRET TELLTALE INDICATOR.
APPLICATION FILED JULY 16, 1913.

1,197,001.

Patented Sept. 5, 1916.
2 SHEETS—SHEET 1.

Witnesses
H. A. Robinette
G. M. Stucker

Inventor
Frank W. Wood
By Eugene Cushman Reg.
Attorney

F. W. WOOD.
TURRET TELLTALE INDICATOR.
APPLICATION FILED JULY 16, 1913.
1,197,001. Patented Sept. 5, 1916.
2 SHEETS—SHEET 2.
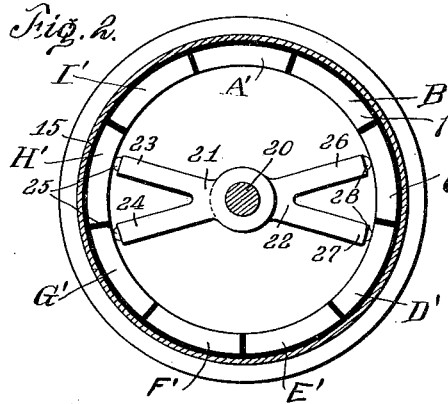
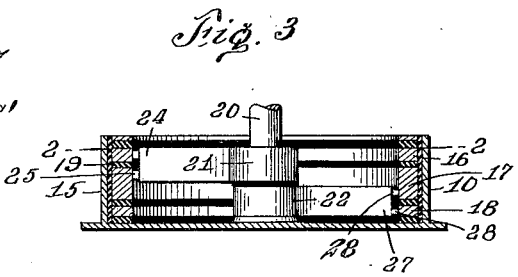
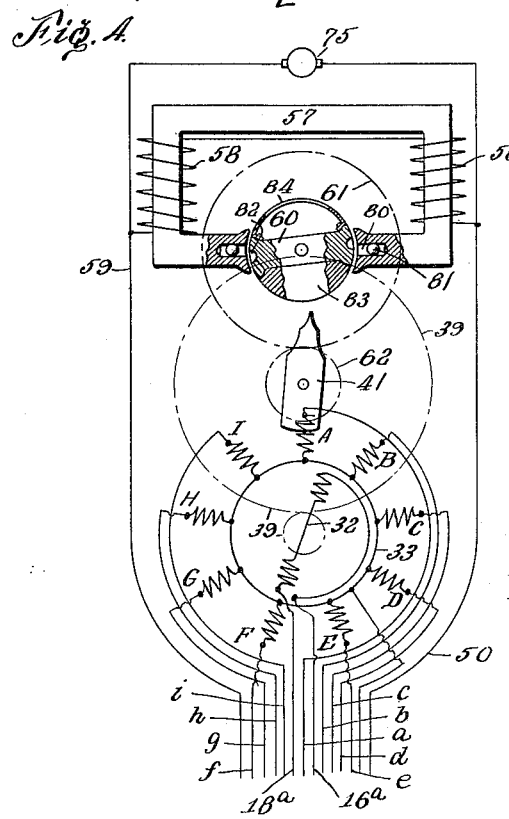
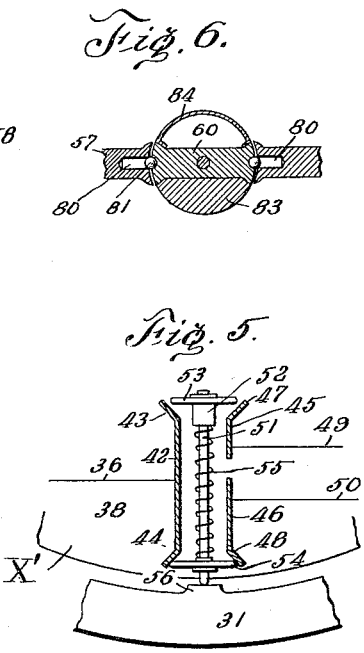
Witnesses
Inventor
Frank W. Wood
By
Attorney

UNITED STATES PATENT OFFICE.

FRANK W. WOOD, OF NEW YORK, N. Y., ASSIGNOR TO CHARLES CORY & SON, INCORPORATED, OF NEW YORK, N. Y., A CORPORATION OF NEW YORK.

TURRET TELLTALE INDICATOR.

1,197,001.     Specification of Letters Patent.     Patented Sept. 5, 1916.

Application filed July 16, 1913. Serial No. 779,317.

*To all whom it may concern:*

Be it known that I, FRANK W. WOOD, a citizen of the United States, residing at New York, in the county of New York and State of New York, have invented new and useful Improvements in Turret Telltale Indicators, of which the following is a specification.

This invention relates to a position indicator or tell-tale indicating system designed particularly for use in turrets of battle ships, but which may be employed in other relations when desired.

In operating battle ships, it is very desirable that the guns of the turrets be not trained angularly toward each other within certain limits. Damage frequently results when this precaution is not observed, and may be due either to shock of the firing, or to a shot from one gun striking the muzzle of another, in an adjacent turret. The guns in each turret being movable with the turrets themselves, there are many angular positions in which each gun may be aimed, outside the danger zone of the guns in an adjacent turret, if the gunner had accurate knowledge of the angular positions of the guns last mentioned. When a gun in one turret is in a certain angular position, a gun in an adjacent turret may be trained to a position which it would not usually occupy, or in which it ordinarily could not fire, if the first gun was angularly nearer. The operating range, therefore, of the guns in each turret is to some extent directly dependent upon the position in which the guns in an adjacent turret are aimed.

Various systems have been devised to indicate to gunners in the several turrets, the angular positions of guns in adjacent turrets that lie in the danger zone. In one of the systems to which I refer, each turret contains an indicator operated mechanically as the turret rotates, showing the position of said turret relatively to the center line of the ship, and an electrically operated indicator actuated through a transmitter in an adjacent turret that represents correctly the angular position of such adjacent turret and its guns, said indicators being at all times visible to the gunners of the turret within which they are placed.

In the present invention I employ an electrically operated indicator within each turret to show the position of the turret to the occupants thereof, and a second electrically operated indicator that gives correctly the position of an adjacent turret, the guns of which may be trained into the danger zone. These indicators are actuated by a step by step motor through a transmitter. In the other system to which I refer the indicator pointer is connected directly to the shaft of the motor and as said motor moves through a considerable angular distance at each step, the pointer will be moved the same distance which distance depends upon the number of field magnets in the motor.

A principal object of the present invention is to reduce this angular deflection of the indicator pointers so that the positions of the guns in both turrets between said steps of the motor may be determined. This object is obtained by gearing up the transmitters through which the motors are operated to rotate them at greater speed than the turrets, and to place reducing gear between the motors and the indicator pointers whereby the rate of movement of said pointers will be lessened and made the same as that of the turrets.

Another object of the invention is directed to means for synchronizing the indicator with the transmitter should the indicator be out of step, and also means for reducing the error between the indicator and the transmitter. In the present system which is known as a "step-up" system, there is a possibility that the indicator may get out of synchronism with the turret, the position of which it is supposed to indicate, from the fact that the transmitter and turret may be moved when the current is shut off from the motor and, consequently, the indicator would remain stationary and therefore show an incorrect position of the turret. To overcome this difficulty, means have been provided for synchronizing the indicator with the turret each time the turret passes a certain fixed point in its rotation, this point preferably being the zero or normal point of the guns with relation to the center line of the ship when out of action.

In the accompanying drawings, Figure 1 is a diagrammatic view of the indicating mechanism complete for two adjacent turrets. Fig. 2 is a cross-sectional view through the transmitter. Fig. 3 is a diametrical sectional view through the transmitter. Fig. 4 is an enlarged diagrammatic view of the synchronizing magnet. Fig. 5 is a detail view of a switch device used in connection with a synchronizing magnet. Fig. 6 is a detail sectional view of the lock for the synchronizing magnet armature.

In the drawings R and L Fig. 1 designate indicating mechanisms in two adjoining turrets X and Y. 10, 10$^a$ are the transmitters in the two turrets; 11 and 12 are two motors in turret X which actuate respectively indicators 13 and 14 also in said turret. The motor 11 operated through the transmitter 10 turns the indicator 13 to show the position of the turret X within which it is placed. The motor 12 operated through the transmitter 10$^a$ in turret Y, in a manner hereinafter described, shows by means of the indicator 14 in turret X the position of turret Y. Similarly, motors 11$^a$ and 12$^a$ in the turret Y operated through the respective transmitters 10$^a$ and 10 display by means of indicators 13$^a$, 14$^a$, the positions of turrets Y and X respectively within the turret Y. By this arrangement the occupants of either turret looking at the indicators will know the exact angular position of their own guns and those of the adjacent turret relatively to each other.

Each transmitter 10, 10$^a$ comprises, as more clearly shown in Figs. 2 and 3, a cylinder 15 within which is placed continuous metal rings 16 and 18, and a segmental metal ring 17, all of the same diameter and insulated from the walls of the cylinder. The rings 16 and 18 are disposed one above and one below the segmental ring 17 from which ring they are insulated by non-conducting material 19. The ring 17 is made of a plurality or series of metal segments separated from one another by non-conducting material and corresponding in number to the field magnets of the motors, in the present instance the ring 17 is made of nine segments as shown in Fig. 2. A suitable contact device is provided actuated by the corresponding turret. In the present embodiment, in the center of the transmitter is a shaft 20 on which is mounted two arms or brushes 21 and 22 insulated from each other and from the shaft. These arms extend in diametrically opposite direction from the axis of the shaft toward the rings and are divided at their outer ends each into two fingers. The fingers 23 and 24 of the arm 21 terminate each in two contact points 25 one above the other. The fingers 26 and 27 of the arm 22 are each provided with contact points 28 similarly disposed. The arm 21 is above the arm 22 and its contact points 25 are arranged to bear on the continuous ring 16 and segmental ring 17 while the contacts 28 of the arm 22 bear upon the continuous ring 18 and segmental ring 17. The angular distance between the contact points 25 of the fingers 23 and 24, and similarly of the contact points 28, is a little less than the angular length of the segments of the ring 17, so that as the shaft 20 rotates carrying the arms 21, 22 with it, the contact points of each of said arms that bear upon the segmental ring 17 will as they rotate engage alternately a single segment and two adjacent segments. The shaft 20 is turned through bevel gears on a radially disposed shaft 29 driven by means of a rack 30 on the stationary barbette 31 around the turret. In this way the transmitter contained in each turret is driven at a higher rotary speed than the containing turret, namely, the turret which contains it. That is, the movable contact member has an increased angular movement for a given angular movement of the turret.

The motors 11, 11$^a$ and 12, 12$^a$ which operate the indicators are similar in every respect and will not be set forth in detail; suffice it to say that each motor comprises a rotor 32 adapted to revolve within a series of circumferentially disposed field magnets, in the present instance nine being shown and are indicated on the diagram of the motor 11 by letters A to I inclusive. The windings of the field magnets are each connected at one end to a common wire 33 and at their other ends each by a separate wire to one of the segments of the ring 17, these connecting wires being designated by letters $a$ to $i$ inclusive, and the segments by A' to I'. The continuous ring 16 of the transmitter is connected by a wire 16$^a$ to one end of the coil of the rotor 32; the other end of said coil is connected to the other continuous ring 18 by a wire 18$^a$. Switches 34, 34$^a$ are mounted on a switch board 35 placed in any convenient position from each of which two wires 36, 37 and 36$^a$, 37$^a$, respectively lead to the turrets X and Y where wires 36, 36$^a$ are connected each to a circuit changer 38, 38$^a$ of novel construction which will shortly be described. The other wires 37, 37$^a$ connect directly with the continuous rings 18 of the transmitters 10 and 10$^a$. The shaft of the motor 11 is connected by gearing 39 of any suitable kind, with the shaft of a pointer 41 forming a part of the indicator 13, the position of said pointer to the right or left of zero or normal position indicating the position of the turret X.

The transmitter 10$^a$, motor 11$^a$ and indicator 13$^a$ in turret Y are duplicates of similar parts in the turret X the pointer 41$^a$ of the indicator 13$^a$ designating by its position the angular deflection from normal of the turret Y. Branch wires $a^2$ to $i^2$ inclusive connect the wires $a$ to $i$ with the windings A$^2$ to I$^2$ inclusive of the field magnets of the motor 12$^a$. By means of this connection the motor 12$^a$ will run in unison with the motor 11 whenever the transmitter 10 is actuated by the rotation of turret X and thereby indicate through the pointer 41$^b$ within the turret Y the position of turret X. Another set of branch wires $a^3$ to $i^3$ inclusive are joined to the wires $a'$ to $i'$, which connect the transmitter 10$^a$ to the motor 11$^a$ within the turret Y, and extend to the motor 12 in the turret X for operating the pointer 41$^c$ in said turret whenever the turret Y is revolved.

In the system hereinbefore referred to the pointer of the electric indicator is connected directly to the shaft of the motor and moves in unison therewith, the movement being a step by step movement. The transmitter is geared to the barbette in such manner as to make one rotation for each revolution of the turret. As thus arranged the angular deflection of the pointer or each step in the movement thereof is somewhat wide, and to reduce the length of these steps of the pointer the system of the present invention has been devised. Here the transmitter is geared up from the barbette so that it maks a number of revolutions for each revolution of the turret the ratio of the gearing depending upon various causes not necessary to mention, but may be greater or less as circumstances warrant. In the present instance the ratio of movement of turret and transmitter is as 1 to 8. The motor will run in synchronism with the transmitter, and to turn the pointer of the indicator through the same angular distance traveled by the turret, said pointer is geared down from the motor the same ratio as the transmitter is geared up. With a motor having nine field magnets as shown, there will be eighteen steps of twenty degrees each in a complete rotation of the motor and with a ratio of gearing between the rack on the barbette and the transmitter as stated, a movement of two and one-half degrees of the turret will turn the transmitter through an arc of twenty degrees or eight times as great. This movement of the transmitter will cause the motor to turn one step of twenty degrees and as the pointer 41 is geared down from the motor in the same ratio as the transmitter is geared up, said pointer will move through a distance one-eighth as great as that traveled by the motor or two and one-half degrees. It will thus be seen that the relatively wide steps in the movement of the motor are by this system reduced so that slight angular movements of the turret are shown by the indicator. The result of this is that the indicator will indicate quite accurately the different turret positions.

Fastened upon each turret indicated diagrammatically in Figs. 1 and 5 and rotatable with the turret is the circuit changer 38 heretofore mentioned, each circuit changer comprising a straight metal plate 42 with outwardly inclined ends 43, 44. The wire 36 is connected to the plate 42. Spaced from the plate 42 but parallel therewith are two plates 45 and 46 in line with each other, their adjacent ends however being separated. The opposite extremities of the plates 45 and 46 are inclined as at 47 and 48 opposite the inclinations 43, 44 on the plate 42. Wires 49 and 50 are connected to the respective plates 45 and 46. Between the plate 42 and the two plates 45, 46 is a pin 51 slidable in a bearing 52 and provided at its ends with heads 53, 54 so disposed that when the pin is moved in one direction the head 53 will contact with the inclines 43 and 47 forming an electrical connection between the plates 42 and 45, and the wires 36 and 49. When the pin is moved in the opposite direction the head 54 engages the inclines 44 and 48 of the plates 42 and 46 and closes an electrical circuit between the wires 36 and 50. The wire 49 connects the plate 45 with the continuous ring 16 of the transmitter. Surrounding the pin 51 is a spring 55 that is held under tension between the bearing 52 and the head 54 so that when the spring is unrestrained, it will hold the head 53 in contact with the plates 42 and 45. On the barbette 31 is a lug 56 which, as the turret rotates, engages the projecting end of the pin 51 and pushes said pin inwardly to close the circuit between plates 42 and 46 and open the circuit between the plates 42 and 45. This lug 56 is so placed on the barbette as to close the circuit between plates 42 and 46 whenever the turret is in zero or normal position. A slight turn however of the turret to right or left of such position will carry the pin from said lug and relieve the spring 55 which immediately breaks the electrical connection between the plates 42 and 46 and connects the plates 42 and 45.

Before proceeding further with the description of the invention the electrical circuit through the indicating mechanism of turret X will be described, this turret being supposed to be turned from the normal through an arc of two and one-half degrees to the right. The switch 34 at the switch board 35 being closed the electrical current passes therefrom through the wire 36 to the plate 42 of the circuit changer 38, thence through head 53, plate 45, wire 49 to the continuous ring 16 of the transmitter. From said ring the current passes through the fingers 23, 24 of the arm 21 to the segment E' of the ring 17, thence by wire $e$ to field magnet E of the motor 11 then by the common wire 33 to the field magnets A to I, thence back to the transmitter by the wires $a$, $i$, to the segments A', I', fingers 26, 27 of the arm 22 to the continuous ring 18 and finally through the wire 37 back to switch 34 on the switch board. The current through the rotor 32 is from the switch 34 at the switch board, through wire 36, circuit changer 38, wire 49, continuous ring 16 of the transmitter, wire 16ª to rotor 33 through the rotor and back by wire 18ª to continuous ring 18 thence through wire 37 to switch 34. These two circuits energize the motor 11 and cause its rotor to turn to the position indicated in Fig. 1, twenty degrees to the right of its normal position. Through the reducing gearing 39 the pointer 41 is turned through an angular distance one-eighth as great as the rotor or two and one-half degrees. A further movement of two and one-half degrees of the turret will cause the motor to turn twenty degrees and the pointer of the indicator to turn a further two and one-half degrees or five degrees in all. From this it will be evident that every movement of the turret through an angular distance of two and one-half degrees will be indicated by the pointer instead of twenty degrees as would be the case were the pointer connected directly to the shaft of the motor as in the pending application. That the gunners in the turret Y may know the position of the guns of turret X a part of the current through the wires from the transmitter 10 to the motor 11 are shunted through the branch wires $e^2$, $a^2$, $i^2$, $16^b$ and $18^b$ to the motor $12^a$ in the turret Y to operate said motor synchronously with motor 11 and turn the pointer $41^b$ of the indicator $14^a$ in said turret Y coördinately with the pointer 41.

Included in each indicator is a synchronizing means for adjusting the position of the pointer to that of the turret at a determined point in the angular movement of said turret, said means comprising a magnet 57, the winding 58 of which is connected on one side by the wire 50 with the plate 46 of the circuit changer 38 and on the other side by a wire 59 with the return wire $18^a$. A branch wire $50^a$ extends from the wire 50 to the synchronizing magnet $57^a$ in the turret Y and a return wire $59^a$ leads back to the branch wire $18^b$ running from the rotor of the motor $12^a$. The poles of the synchronizing magnet 57 are in line and between them is placed a rotating armature 60 on the shaft of which is a gear wheel 61 meshing with a smaller gear wheel 62 on the shaft of the pointer 41. In the present instance the number of teeth in the gear wheel 61 is to the number of teeth in the gear wheel 62 as two and eight-tenths is to one, this ratio being adopted to prevent the armature 60 being turned so far during the usual operation of the turret as to pass from the field of the synchronizing magnet. From this it will be evident that should the turret be rotated through an arc of one hundred and eighty degrees, the pointer 41 being turned the same distance, the armature 60 will be deflected about sixty four degrees. This ratio and also the ratio between the barbette and transmitter and between the motor and indicator may be changed at will to suit conditions. During the rotation of the turret the head 54 being separated from the plates 42, 46 of the circuit changer 38, the current between the wires 36 and 50 is broken, thus cutting out the synchronizing magnets, so that all the current passes to the motors 11, $12^a$, but as soon as the turret is returned to normal position the lug 56 on the barbette 31 pushes the pin 51 of the circuit changer inwardly to bring the head 54 in contact with the plates 42 and 46 and short circuit the current to wire 50 through the synchronizing magnet coils 56 and back through wires 59, $18^a$, continuous ring 18, wire 37 to the switch 34 at the switch board. This movement of the pin 51 breaks the circuit between plates 42 and 45 by the separation of the head 53 therefrom so that no current will pass to the motor. The synchronizing magnets 57, $57^a$ being thus vitalized by the full strength of the current their armatures 60 will be drawn into position in line with the poles thereof and the indicator pointers 41, $41^b$ are thereby moved mechanically by the synchronizers and thus are restored to normal or zero position to correspond with the position of the turret X.

As a further evidence to the gunners that the turrets are in zero or normal position a check indicator is provided in connection with each synchronizing device which indicator in the present instance is in the form of an incandescent lamp 75 in a shunt circuit from the wires 50, 59, which when the current passes through the synchronizing magnet causes said incandescent lamp to glow, thus giving a further visual evidence that the turret is in normal or zero position.

When the turret is returned to zero or normal position after an angular displacement in one direction or the other the circuit is shunted by means of the switch 38 around the transmitter and through the synchronizing magnet, all as heretofore described. The synchronizing magnet being thus vitalized its armature 60 will be attracted and tends to lie approximately in line with the pole pieces of the magnet. To effect an exact alinement of the armature in this position a simple centering device is provided, the preferred form of which is clearly shown in Figs. 4 and 6. In each pole piece of the magnet 57 a hole 80 is bored, and in each of these holes a roller or ball of magnetic metal preferably a steel ball 81 is snugly fitted and adapted to move longitudinally therein. Each end of the armature 60 has a hemispherical depression 82 formed therein, which when said armature is in the normal or zero position, will lie opposite the hole or ball socket 80 in the magnet.

The centering operation is substantially as follows:—In case the armature does not come to rest exactly alined with the poles, the magnetic field between the poles tends to pull the balls out of the holes. This causes the balls to force their way into the sockets and in doing so they center the armature between the poles of the magnet. The centering action of the balls is due to their rounded or tapering form.

If the armature 60 be turned out of normal position and while thus angularly displaced the current be sent through the magnet 57 the armature will be drawn by the magnetism of the pole pieces into line therewith, the balls 81 at the same time being drawn against the outer surface of the armature, and as soon as the latter reaches its zero position enter the hemi-spherical notches 82 and lock the armature against further movement, so long as the current is maintained through the coils of the magnet. When the current is broken through said coils the pole pieces, balls, and armature will lose their magnetism and the force which held the balls in the depressions 82 is lost and the balls are readily moved out of said sockets when the armature is turned by the gearing 61, 62.

To maintain the balls in the holes 80 when the ends of the armature pass beyond the pole pieces filling blocks 83 of non-magnetic material are secured on each side of the armature between the pole pieces. In place of the block 83 a curved strip of non-magnetic material 84 may be fastened to each side of the armature.

What I claim is:

1. A tell-tale system for indicating firing positions comprising two turrets, a series of contact segments in each of said turrets, a movable contact device corresponding to each of said series of segments, means for moving each of said contact devices by its driving turret through an increased rotary angle with respect to its turret, a series of separate circumferentially disposed field coils in each turret connected respectively with their corresponding contact segments in the other turret, a rotor coöperating with each set of field coils so as to be rotated thereby when the circuits through the coils in one turret are closed by the contact device in the other turret and operating to give said rotors the same angular rotary movement as said movable contact devices, an indicating member actuated by each rotor and having the same angular rotation as the turret whose position it indicates, and a synchronizing device for each rotor having an armature driven by the rotor, and means for energizing the synchronizing devices when the turrets are in predetermined position to synchronize the armatures and thereby synchronize the indicating members.

2. A tell-tale system for indicating firing positions, comprising two turrets, a transmitter in each of said turrets, means operated by the rotation of each turret for actuating the transmitter contained therein through an increased rotary angle with respect to a given rotary movement of the turret, a series of separate circumferentially disposed field coils in each turret, conductors connecting said field coils with said transmitters respectively, a rotor coöperating with each set of field coils so as to be rotated thereby when circuits through said coils are closed by their corresponding transmitters and operating to give said rotors an increased rotary movement with respect to the turrets, an indicating member actuated by each rotor at a slower rotary speed than the rotor and having the same angular rotation as its corresponding turret, and electro-magnetic means independent of said field coils for effecting a movement of said rotors to synchronize the said indicating members.

3. A tell-tale system for indicating firing positions comprising two turrets, a series of contact segments in each of said turrets, a movable contact device corresponding to each of said series of segments, means for moving each of said contact devices by its driving turret through an increased rotary angle with respect to its turret, a series of separate circumferentially disposed field coils in each turret connected respectively with their corresponding contact segments in the other turret, a rotor coöperating with each set of field coils so as to be rotated thereby when the circuits through the coils in one turret are closed by the contact device in the other turret and operating to give said rotors the same angular rotary movement as said movable contact devices, an indicating member actuated by each rotor and having the same angular rotation as the turret whose position it indicates, electro-magnetic synchronizers connected with the rotors, and means controlled by the positions of the turrets for opening the circuits through the field coils and for closing circuits through the synchronizers to synchronize the indicating members in a predetermined position of the turrets.

4. A turret tell-tale system comprising two turrets, a transmitter in each of said turrets, means operated by the movement of each turret for driving each transmitter at a speed greater than that of the containing turret, a motor in each turret operated through and synchronously with the transmitter in the same turret, a motor in each turret operated through and synchronously with the transmitter in the other turret, two position indicators in each turret, means including step down gearing between each motor and its position indicator for turning the indicator at the same speed as that of the turret, a synchronizing device for each indicator, and means actuated by the rotation of the turret at one point in its movement for controlling said synchronizing device to correct any errors of position of the indicator.

5. A turret tell-tale system comprising two turrets, a transmitter in each of said turrets, means operated by the movement of each turret for driving each transmitter at a speed greater than that of the containing turret, a motor in one turret operated through and synchronously with the transmitter in the same turret, a second motor operated through and synchronously with the transmitter in the other turret, two position indicators in each turret, means including step down gearing between each motor and its position indicator for turning the indicator at the same speed as that of the turrets, a synchronizing magnet in a shunt circuit around each motor and an armature for each of said magnets, operating means connecting each indicator and one of said armatures, and a circuit changer carried by each of said turrets for shunting the circuit at one point in the movement of said turret from a motor through the synchronizing magnet.

6. A turret tell-tale system comprising two turrets, a transmitter in each of said turrets, means operated by the movement of each turret for driving the transmitter at a speed greater than that of the containing turret, a motor in one turret operated through and synchronously with the transmitter in the same turret, a second motor in the other turret operated through and synchronously with the transmitter in the other turret, two position indicators in each turret, means including step down gearing between each motor and its corresponding position indicator for turning the indicator at the same speed as that of the turret whose position it indicates, a synchronizing magnet for each indicator in a shunt circuit around its corresponding motor, an armature for said magnet, step down gearing between said indicator and the armature, a circuit changer movable with the turret, and fixed means for operating said circuit changer whenever the motor is in zero or normal position to shunt the circuit from the motor connected thereto to the synchronizing magnet for correcting any errors of position of the indicator.

7. In a turret tell-tale system comprising a transmitter within and operated by the movement of the turret, an indicator having an indicating member electrically operated through the movement of said transmitter, a synchronizing magnet having a movable armature connected to the said indicating member to move the indicating member when synchronizing it, and a magnetic lock between said magnet and armature for holding the armature in normal or zero position when the magnet is vitalized.

8. A turret tell tale system comprising a transmitter within and adapted to be rotated by the turret, an indicator electrically operated through the movement of said transmitter, a synchronizing armature connected to the indicator to mechanically actuate the same and an electromagnet in a shunt circuit from the connection between the transmitter and the indicator, and a centering device for said armature for centering the same when said armature is moved approximately to a zero or normal position by an electric current passing through the coils of said magnet.

9. A turret tell tale system comprising two turrets, a transmitter in each turret, an indicator in each turret corresponding to that turret and another corresponding to the other turret, electrical connections between each transmitter and the indicator in one turret, and connecting with its corresponding indicator in the other turret, a synchronizing device associated with each indicator, each synchronizing device comprising a rotary armature geared to its corresponding indicator for mechanically actuating the indicator, and an electromagnet, means for passing a current through the electromagnets of the indicators corresponding to either turret when that turret is in a predetermined position, to bring the armatures thereof approximately into their zero position, said synchronizing means including electrically controlled means for centering said armatures after being brought to their approximate zero positions.

10. In a turret tell tale system in combination, a turret, a transmitter actuated by the rotation of the turret, an indicator including a movable indicating part within the turret for indicating the turret position, a second indicator including a movable indicating part outside of the turret, means for controlling both of said indicators through said transmitter, a synchronizing device associated with each indicator comprising a rotatable armature mechanically connected with the indicating part to actuate the same and an electromagnet, means for energizing the electromagnets of said synchronizing devices when the turret is in a predetermined zero position, the electromagnets operating to bring said armatures approximately to their predetermined zero position, said magnets having movable members controlled thereby adapted to be impelled by the magnetic field into engagement with the armatures to effect an accurate zero alinement of said armatures.

11. A tell-tale system for indicating firing positions, comprising two turrets, a transmitter in each of said turrets, means operated by the rotation of each turret for actuating the transmitter contained therein through an increased rotary angle with respect to a given rotary movement of the turret, an electromagnetic motor in each turret, conductors connecting said motors respectively with said transmitters to enable the transmitters to control the motors, said motors including rotors, an indicating member actuated by each rotor, and an electromagnetic synchronizer corresponding to each motor, said synchronizers each having an armature connected with its corresponding indicating member, and means actuated by the turrets when in a predetermined posotion for energizing said synchronizers to mechanically move and synchronize said indicating members.

12. A tell-tale system for indicating firing positions, comprising two turrets, a transmitter in each of said turrets, means operated by the rotation of each turret for actuating the transmitter contained therein, a motor including a rotor in each turret, motor circuits connecting said motors with said transmitters respectively, an indicating member connected with each rotor, an electromagnetic synchronizer connected with each rotor, and means for opening the motor circuits and closing synchronizing circuits through said synchronizers at a predetermined position of said turrets, said synchronizers each operating to rotate its corresponding indicating member and thereby synchronize said indicating members.

In testimony whereof I have hereunto set my hand in presence of two subscribing witnesses.

FRANK W. WOOD.

Witnesses:
E. H. BICKERTON,
S. P. HOLLINGSWORTH.

Copies of this patent may be obtained for five cents each, by addressing the "Commissioner of Patents, Washington, D. C."